United States Patent
Kuo et al.

(10) Patent No.: US 8,824,907 B2
(45) Date of Patent: Sep. 2, 2014

(54) ELECTROPHOTOGRAPHIC PRINTING WITH COLUMN-DEPENDENT TONESCALE ADJUSTMENT

(75) Inventors: Chung-Hui Kuo, Fairport, NY (US); Stephen J. Farnand, Fairport, NY (US); Shawn Edward O'Hara, Rochester, NY (US); Stacy M. Munechika, Fairport, NY (US)

(73) Assignee: Eatsman Kodak Company, Rochester, NY (US)

( * ) Notice: Subject to any disclaimer, the term of this patent is extended or adjusted under 35 U.S.C. 154(b) by 428 days.

(21) Appl. No.: 13/269,662

(22) Filed: Oct. 10, 2011

(65) Prior Publication Data

US 2012/0269527 A1    Oct. 25, 2012

Related U.S. Application Data

(60) Provisional application No. 61/477,767, filed on Apr. 21, 2011.

(51) Int. Cl.
| | |
|---|---|
| *G03G 15/00* | (2006.01) |
| *G06K 15/02* | (2006.01) |
| *G06K 15/12* | (2006.01) |
| *H04N 1/401* | (2006.01) |
| *G03G 15/043* | (2006.01) |
| *H04N 1/405* | (2006.01) |
| *H04N 1/407* | (2006.01) |

(52) U.S. Cl.
CPC .......... *G03G 15/043* (2013.01); *G06K 15/1868* (2013.01); *G06K 15/1881* (2013.01); *G06K 15/1247* (2013.01); *H04N 1/4015* (2013.01); *G06K 15/1209* (2013.01); *H04N 1/405* (2013.01); *H04N 1/407* (2013.01)

USPC .................................................. 399/49; 399/72

(58) Field of Classification Search
CPC ............ G03G 15/043; G06K 15/1209; G06K 15/1868; G06K 15/1881; G06K 15/1247; H04N 1/407; H04N 1/4015
USPC .............................. 399/49, 72, 74, 59, 60, 53
See application file for complete search history.

(56) References Cited

U.S. PATENT DOCUMENTS

| | | |
|---|---|---|
| 5,200,765 A | 4/1993 | Tai |
| 5,485,289 A | 1/1996 | Curry |
| 5,493,322 A | 2/1996 | Ng |

(Continued)

FOREIGN PATENT DOCUMENTS

EP    0 892 549    6/1992

OTHER PUBLICATIONS

"Scanner-based technique to adjust LED printbar uniformity" by Mizes, et al. IS&T NIP19 pp. 532-536, ISBN 0-89208-247-x, dated Sep. 28, 2003.

(Continued)

*Primary Examiner* — Billy Lactaoen
(74) *Attorney, Agent, or Firm* — Christopher J. White; Kevin E. Spaulding

(57) ABSTRACT

Electrophotographic (EP) streaking compensation is performed. A tonescale is measured for each column and a per-column gain computed to compensate for variations. An adjustment tonescale is determined and a per-column adjustment-tonescale gain computed to correct for remaining error after the per-column gain is applied. The two corrections are used together to provide improved compensation quality.

4 Claims, 11 Drawing Sheets

(56) References Cited

U.S. PATENT DOCUMENTS

| | | |
|---|---|---|
| 6,452,696 B1 | 9/2002 | Bogart et al. |
| 6,554,388 B1 | 4/2003 | Wong et al. |
| 6,608,641 B1 | 8/2003 | Alexandrovich et al. |
| 7,038,816 B2 | 5/2006 | Klassen et al. |
| 7,058,325 B2 | 6/2006 | Hamby et al. |
| 7,564,475 B1 | 7/2009 | Mizes |
| 7,663,654 B2 | 2/2010 | Arai et al. |
| 2005/0036705 A1 | 2/2005 | Viassolo |
| 2005/0134624 A1 | 6/2005 | Mizes |
| 2006/0133870 A1 | 6/2006 | Ng |
| 2007/0211913 A1* | 9/2007 | Washio .................. 382/100 |
| 2008/0226361 A1 | 9/2008 | Tomita et al. |
| 2010/0097657 A1 | 4/2010 | Kuo et al. |

OTHER PUBLICATIONS

"Automatic density control for increased print uniformity and printer reliability with inline linear array sensing" by Mizes et al. IS&T NIP24 pp. 206-210, ISBN 978-0-89208-279-7, dated Sep. 6, 2008.

* cited by examiner

ELECTROPHOTOGRAPHIC PRINTING WITH COLUMN-DEPENDENT TONESCALE ADJUSTMENT

CROSS-REFERENCE TO RELATED APPLICATIONS

This application claims the benefit of U.S. Provisional Patent Application No. 61/477,767 filed Apr. 21, 2011, which is incorporated herein by reference in its entirety.

Reference is made to commonly assigned, U.S. patent application Ser. No. 12/748,762, filed Mar. 29, 2010, now U.S. Pat. No. 8,482,802 entitled "SCREENED HARDCOPY REPRODUCTION APPARATUS WITH COMPENSATION," by Tai, et al., the disclosure of which is incorporated by reference herein.

FIELD OF THE INVENTION

This invention pertains to the field of printing and more particularly to correcting for nonuniformities in printed images.

BACKGROUND OF THE INVENTION

Printers are useful for producing printed images of a wide range of types. Printers print on receivers (or "imaging substrates"), such as pieces or sheets of paper or other planar media, glass, fabric, metal, or other objects. Printers typically operate using subtractive color: a substantially reflective receiver is overcoated image-wise with cyan (C), magenta (M), yellow (Y), black (K), and other colorants. Various schemes can be used to process images to be printed.

This application is related to commonly assigned, co-pending U.S. Patent Publication No. 2010/0097657, filed Oct. 12, 2009, entitled "Adaptive Exposure Printing and Printing System," by Kuo et al., the disclosure of which is incorporated herein by reference.

Electrophotographic (EP) printers have an optical writer that exposes a row at a time in the cross-track direction. The receiver is sequenced through the printer in the in-track direction, which is substantially perpendicular to the cross-track direction. However, printers can have nonuniformities. For example, non-uniform exposure of an area intended to be constant density on the receiver can result in a streak, an area unintentionally exposed differently than its surround, extending in the slow-scan direction. "Streaks" are columnar visible artifacts produced by differences between one pixel and the next in the cross-track direction. "Bands" are row-oriented visible artifacts produced by variations over time as the receiver moves through the printer. Various schemes have been proposed for correcting streaks and bands. U.S. Pat. No. 7,058,325 to Hamby et al. deposits a test patch, measures its density, and corrects using a feedback or feedforward control routine. U.S. Patent Publication No. 20080226361 by Tomita et al. describes measuring multiple patterns, each containing multiple rows of toner, possibly set at different angles on the page, and combining the measurement results to determine image adjustments. U.S. Pat. No. 7,564,475 to Mizes prints a test pattern and senses its reflectance (density), then determines frequency, amplitude, or phase of banding based on the sensed test pattern. The intensity of a laser beam is adjusted to compensate for the banding. U.S. Pat. No. 7,663,654 to Arai et al. adjusts light-emission period of LEDs to correct for periodic variations.

U.S. Pat. No. 6,452,696 to Bogart et al. describes normalizing the output of multiple light sources. Each light source is driven by an individual digital-to-analog converter (DAC). However, the requirement for a DAC for each light source can become prohibitive as resolution, and therefore the number of light sources, increases. U.S. Pat. No. 6,554,388 to Wong et al. describes computing an exposure element average density value using measurements of a test patch. A non-uniformity correction value is computed based on a difference between the exposure element average density value and an expected average.

To accommodate hardware limitations and reduce noise, EP printers typically use screened patterns (e.g. halftones) rather than continuous tones. Marks on the receiver are placed according to a variety of geometrical patterns so that a group of marks, when seen by the eye, gives a rendition of a desired intermediate color tone between the color of the background (e.g. paper stock) and the color of the mark. U.S. Pat. No. 5,485,289 to Curry, and commonly assigned EP 0 892 549 B1 to Tai et al., describe various methods for halftoning and designing screening patterns.

Tai et al. also recognize non-uniformities in EP printheads that can produce streaks. Some streaks are consistently lighter or darker than their surrounds, corresponding e.g. to consistent over- or under-exposure on the photoreceptor. However, some streaks are lighter than their surround in some areas and darker than their surround in other areas. There is a need to compensate for both types of streaks.

U.S. Patent Application Publication No. 2005/0036705 to Viassolo et al., and U.S. Pat. No. 7,038,816 to Klassen et al., describe systems to reduce streaking by adjusting tone reproduction curve (TRC) values. However, adjusting TRC values confounds streaking-reduction with the intended purpose of TRC values, which is compensating for device non-linearities. This can increase memory requirements of a printer and restrict the available compensation to the range of adjustment provided by the TRC.

U.S. Patent Application Publication No. 2005/0134624 to Mizes describes various test patterns that can be printed on a receiver and scanned to determine streaking-compensation values. "Scanner-based technique to adjust LED printbar uniformity" by Mizes et al. (IS&T NIP19 pp. 532-536, ISBN 0-89208-247-X, dated Sep. 28, 2003) also describes test patterns and schemes for compensation. "Automatic density control for increased print uniformity and printer reliability with inline linear array sensing" by Mizes et al. (IS&T NIP24 pp. 206-210, ISBN 978-0-89208-279-7, dated Sep. 6, 2008) describes capturing an image of a test pattern strip to perform compensation. However, these schemes use TRCs for compensation, so suffer from the same limitations as Viassolo et al. and Klassen et al. Additionally, Mizes et al. (NIP19) disclose that some observers can perceive density variations with a peak-to-peak amplitude of only 0.25 ΔL*. However, Mizes et al. require extensive and time-consuming measurements to reach high precision.

There is a continuing need, therefore, for an improved way of compensating for streaks and other non-uniformities in a hardcopy reproduction apparatus.

SUMMARY OF THE INVENTION

According to an aspect of the present invention, there is provided a method of printing an image on a receiver using an electrophotographic printer adapted to deposit toner in a plurality of columns on the receiver, the method comprising:

printing a test target having a plurality of densities in each column on a first receiver;

receiving measurements of the test target on the receiver to provide a respective column tonescale for each column;

receiving an aim tonescale and a crossover range of pixel levels;

computing a respective column-tonescale gain for each column so that the respective first product of each column-tonescale gain and its respective column tonescale intersects the aim tonescale in the crossover range;

determining an adjustment tonescale using the respective residual errors between the aim tonescale and each first product, wherein the adjustment tonescale changes sign within the crossover range;

computing a respective adjustment-tonescale gain for each column using the respective first product, the adjustment tonescale, and the aim tonescale;

receiving a plurality of input pixel values, and, for each pixel value:

computing a first adjustment by multiplying the value of the aim tonescale at the pixel value by the column-tonescale gain for the corresponding column;

computing a second adjustment by multiplying the value of the adjustment tonescale at the pixel value by the adjustment-tonescale gain for the corresponding column;

exposing the photoreceptor in a respective pixel area to light corresponding to the first and second adjustments;

applying toner to the photoreceptor to form thereon a visible image corresponding to the exposure of the photoreceptor; and transferring the visible image to a second receiver so that a print corrected for nonuniformity is produced.

According to another aspect of the present invention, there is provided a method of printing an image on a receiver using an electrophotographic printer adapted to deposit toner in a plurality of columns on the receiver, the method comprising:

printing a test target having a plurality of densities in each column on a first receiver;

receiving measurements of the test target on the receiver to provide a respective column tonescale for each column;

determining a plurality of aim tonescales;

selecting one of the aim tonescales for each column and computing a respective column-tonescale gain for each column so that the respective first product of each column-tonescale gain and its respective column tonescale approximates the selected aim tonescale within a selected tolerance;

receiving a plurality of input pixel values, and, for each pixel value:

computing an adjusted pixel value by multiplying the value of the selected aim tonescale at the pixel value by the column-tonescale gain for the corresponding column; and exposing the photoreceptor in a respective pixel area to light corresponding to the adjusted pixel value;

applying toner to the photoreceptor to form thereon a visible image corresponding to the exposure of the photoreceptor; and transferring the visible image to a second receiver so that a print corrected for nonuniformity is produced.

An advantage of this invention is that it can correct for streaks that are not related to each other by a simple multiplication. Various embodiments can correct for streaks that are lighter than the surround at some densities, but darker than the surround at others. Furthermore, various embodiments can correct non-uniformities that vary in time as the printer operates, or that vary along the in-track direction of printing.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

Figure 1:
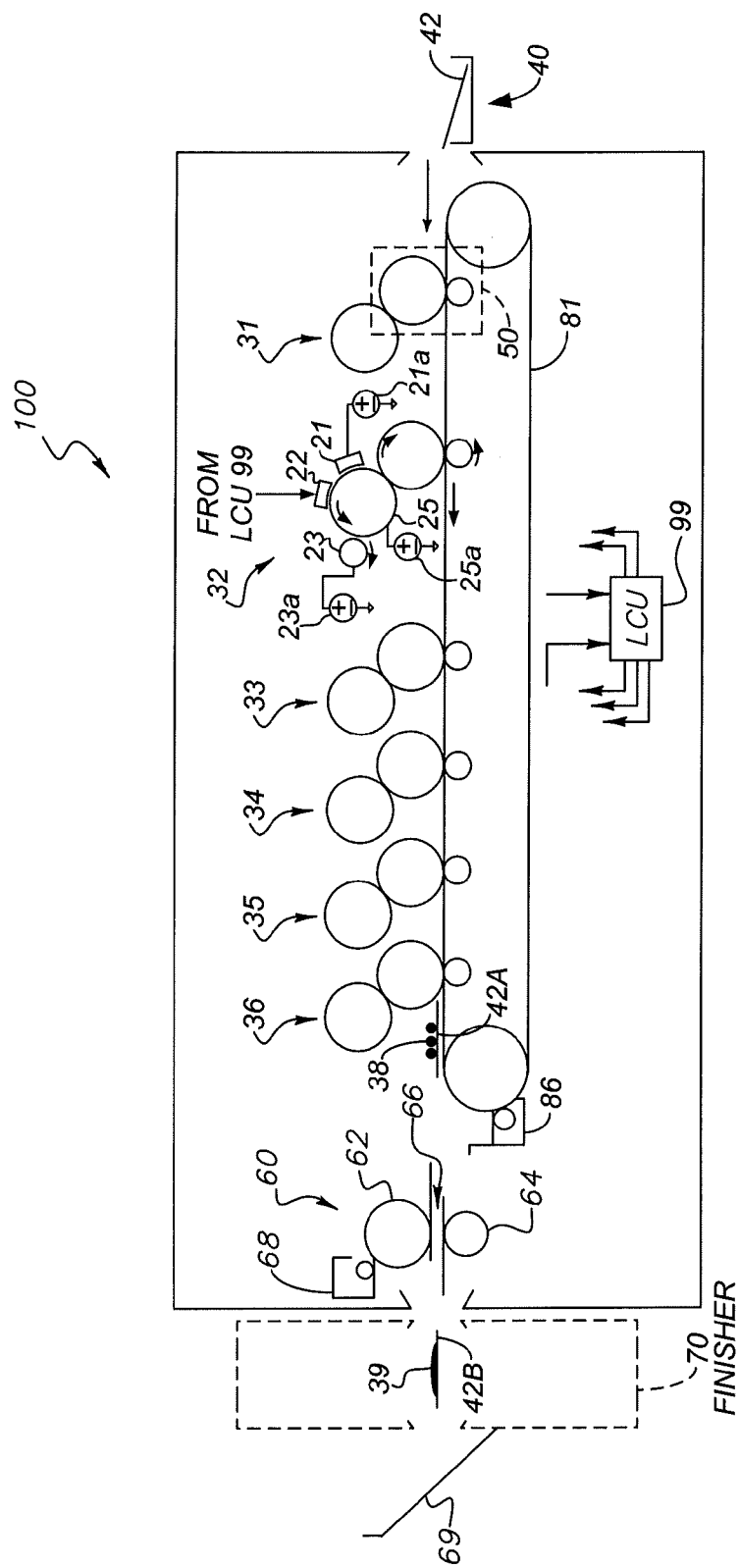
FIG. 1 is an elevational cross-section of an electrophotographic reproduction apparatus suitable for use with various embodiments.

The attached drawings are for purposes of illustration and are not necessarily to scale.

DETAILED DESCRIPTION OF THE INVENTION

In the following description, some embodiments will be described in terms that would ordinarily be implemented as software programs. Those skilled in the art will readily recognize that the equivalent of such software can also be constructed in hardware. The present description is directed in particular to algorithms and systems forming part of, or cooperating more directly with, various embodiments. Other aspects of such algorithms and systems, and hardware or software for producing and otherwise processing the image signals involved therewith, not specifically shown or described herein, are selected from such systems, algorithms, components, and elements known in the art. Given the system as described in the following, software not specifically shown, suggested, or described herein that is useful for implementation of various embodiments is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice various embodiments described herein.

The electrophotographic (EP) printing process can be embodied in devices including printers, copiers, scanners, and facsimiles, and analog or digital devices, all of which are referred to herein as "printers." Various embodiments are useful with electrostatographic printers such as electrophotographic printers that employ toner developed on an electrophotographic receiver, and ionographic printers and copiers that do not rely upon an electrophotographic receiver. Electrophotography and ionography are types of electrostatography (printing using electrostatic fields), which is a subset of electrography (printing using electric fields).

A digital reproduction printing system ("printer") typically includes a digital front-end processor (DFE), a print engine (also referred to in the art as a "marking engine") for applying toner to the receiver, and one or more post-printing finishing system(s) (e.g. a UV coating system, a glosser system, or a laminator system). A printer can reproduce pleasing black-and-white or color onto a receiver. A printer can also produce selected patterns of toner on a receiver, which patterns (e.g. surface textures) do not correspond directly to a visible image. The DFE receives input electronic files (such as Post-script command files) composed of images from other input devices (e.g., a scanner, a digital camera). The DFE can include various function processors, e.g. a raster image processor (RIP), image positioning processor, image manipulation processor, color processor, or image storage processor. The DFE rasterizes input electronic files into image bitmaps for the print engine to print. In some embodiments, the DFE permits a human operator to set up parameters such as layout, font, color, media type, or post-finishing options. The print engine takes the rasterized image bitmap from the DFE and renders the bitmap into a form that can control the printing process from the exposure device to transferring the print image onto the receiver. The finishing system applies features such as protection, glossing, or binding to the prints. The finishing system can be implemented as an integral component of a printer, or as a separate machine through which prints are fed after they are printed.

The printer can also include a color management system which captures the characteristics of the image printing process implemented in the print engine (e.g. the electrophotographic process) to provide known, consistent color reproduction characteristics. The color management system can also provide known color reproduction for different inputs (e.g. digital camera images or film images).

In an embodiment of an electrophotographic modular printing machine useful with various embodiments, e.g. the NEXPRESS 3000SE printer manufactured by Eastman Kodak Company of Rochester, N.Y., color-toner print images are made in a plurality of color imaging modules arranged in tandem, and the print images are successively electrostatically transferred to a receiver adhered to a transport web moving through the modules. Colored toners include colorants, e.g. dyes or pigments, which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. As used herein, clear toner is considered to be a color of toner, as are C, M, Y, K, and Lk, but the term "colored toner" excludes clear toners. The provision of a clear-toner overcoat to a color print is desirable for providing protection of the print from fingerprints and reducing certain visual artifacts. Clear toner uses particles that are similar to the toner particles of the color development stations but without colored material (e.g. dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective toners are deposited one upon the other at respective locations on the receiver and the height of a respective toner stack is the sum of the toner heights of each respective color. Uniform stack height provides the print with a more even or uniform gloss.

FIG. 1 is an elevational cross-section showing portions of a typical electrophotographic printer 100 useful with various embodiments. Printer 100 is adapted to produce print images, such as single-color (monochrome), CMYK, or hexachrome (six-color) images, on a receiver (multicolor images are also known as "multi-component" images). Images can include text, graphics, photos, and other types of visual content. One embodiment involves printing using an electrophotographic print engine having six sets of single-color image-producing or -printing stations or modules arranged in tandem, but more or fewer than six colors can be combined to form a print image on a given receiver. Other electrophotographic writers or printer apparatus can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing modules 31, 32, 33, 34, 35, 36, also known as electrophotographic imaging subsystems. Each printing module produces a single-color toner image for transfer using a respective transfer subsystem 50 (for clarity, only one is labeled) to a receiver 42 successively moved through the modules. Receiver 42 is transported from supply unit 40, which can include active feeding subsystems as known in the art, into printer 100. In various embodiments, the visible image can be transferred directly from an imaging roller to a receiver, or from an imaging roller to one or more transfer roller(s) or belt(s) in sequence in transfer subsystem 50, and thence to receiver 42. Receiver 42 is, for example, a selected section of a web of, or a cut sheet of, planar media such as paper or transparency film.

Each printing module 31, 32, 33, 34, 35, 36 includes various components. For clarity, these are only shown in printing module 32. Around photoreceptor 25 are arranged, ordered by the direction of rotation of photoreceptor 25, charger 21, exposure subsystem 22, and toning station 23.

In the EP process, an electrostatic latent image is formed on photoreceptor 25 by uniformly charging photoreceptor 25 and then discharging selected areas of the uniform charge to yield an electrostatic charge pattern corresponding to the desired image (a "latent image"). Charger 21 produces a uniform electrostatic charge on photoreceptor 25 or its surface. Exposure subsystem 22 selectively image-wise discharges photoreceptor 25 to produce a latent image. Exposure subsystem 22 can include a laser and raster optical scanner (ROS), one or more LEDs, or a linear LED array.

After the latent image is formed, charged toner particles are brought into the vicinity of photoreceptor 25 by toning station 23 and are attracted to the latent image to develop the latent image into a visible image. Note that the visible image may not be visible to the naked eye depending on the composition of the toner particles (e.g. clear toner). Toning station 23 can also be referred to as a development station. Toner can be applied to either the charged or discharged parts of the latent image.

After the latent image is developed into a visible image on the photoreceptor 25, a suitable receiver 42 is brought into juxtaposition with the visible image. In transfer station 50, a suitable electric field is applied to transfer the toner particles of the visible image to the receiver 42 to form the desired print image on the receiver 42. The imaging process is typically repeated many times with reusable photoreceptors 25.

The receiver 42A is then removed from its operative association with the photoreceptor 25 and subjected to heat or pressure to permanently fix ("fuse") the print image to the receiver 42. Plural print images, e.g. of separations of different colors, are overlaid on one receiver 42A before fusing to form a multi-color print image on the receiver 42B.

Each receiver 42, during a single pass through the six modules 31, 32, 33, 34, 35, 36, can have transferred in registration thereto up to six single-color toner images to form a pentachrome image. As used herein, the term "hexachrome" implies that in a print image, combinations of various of the six colors are combined to form other colors on the receiver at various locations on the receiver. That is, each of the six colors of toner can be combined with toner of one or more of the other colors at a particular location on the receiver to form a color different than the colors of the toners combined at that location. In an embodiment, printing module 31 forms black (K) print images, 32 forms yellow (Y) print images, 33 forms magenta (M) print images, 34 forms cyan (C) print images, 35 forms light-black (Lk) images, and 36 forms clear images.

In various embodiments, printing module 36 forms a print image 38 using a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42A is shown after passing through printing module 36. Print image 38 on receiver 42A includes unfused toner particles.

Subsequent to transfer of the respective print images, overlaid in registration, one from each of the respective printing modules 31, 32, 33, 34, 35, 36, receiver 42A is advanced to a fuser 60, i.e. a fusing or fixing assembly, to fuse print image 38 to receiver 42A. Transport web 81 transports the print-image-carrying receivers 42A to fuser 60, which fixes the toner particles to the respective receivers 42A by the application of heat and pressure. The receivers 42A are serially de-tacked from transport web 81 to permit them to feed cleanly into fuser 60. Transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along transport web 81 before or after cleaning station 86 in the direction of rotation of transport web 81.

Fuser 60 includes a heated fusing roller 62 and an opposing pressure roller 64 that form a fusing nip 66 therebetween. In an embodiment, fuser 60 also includes a release fluid application substation 68 that applies release fluid, e.g. silicone oil, to fusing roller 62. Alternatively, wax-containing toner can be used without applying release fluid to fusing roller 62. Other embodiments of fusers, both contact and non-contact, can be employed with various embodiments. For example, solvent fixing uses solvents to soften the toner particles so they bond with the receiver. Photoflash fusing uses short bursts of high-frequency electromagnetic radiation (e.g. ultraviolet light) to melt the toner. Radiant fixing uses lower-frequency electromagnetic radiation (e.g. infrared light) to more slowly melt the toner. Microwave fixing uses electromagnetic radiation in the microwave range to heat the receivers (primarily), thereby causing the toner particles to melt by heat conduction, so that the toner is fixed to the receiver.

The receivers (e.g. receiver 42B) carrying the fused image (e.g., fused image 39) are transported in a series from the fuser 60 along a path either to a remote output tray 69, or back to printing modules 31, 32, 33, 34, 35, 36 to create an image on the backside of the receiver 42, i.e. to form a duplex print. Receivers 42 can also be transported to any suitable output accessory. For example, an auxiliary fuser or glossing assembly can provide a clear-toner overcoat. Printer 100 can also include multiple fusers 60 to support applications such as overprinting, as known in the art.

In various embodiments, between fuser 60 and output tray 69, receiver 42B passes through finisher 70. Finisher 70 performs various media-handling operations, such as folding, stapling, saddle-stitching, collating, and binding.

Printer 100 includes main printer apparatus logic and control unit (LCU) 99, which receives input signals from the various sensors associated with printer 100 and sends control signals to the components of printer 100. LCU 99 can include a microprocessor incorporating suitable look-up tables and control software executable by the LCU 99. It can also include a field-programmable gate array (FPGA), programmable logic device (PLD), microcontroller, or other digital control system. LCU 99 can include memory for storing control software and data. Sensors associated with the fusing assembly provide appropriate signals to the LCU 99. In response to the sensors, the LCU 99 issues command and control signals that adjust the heat or pressure within fusing nip 66 and other operating parameters of fuser 60 for receivers 42A. This permits printer 100 to print on receivers 42A of various thicknesses and surface finishes, such as glossy or matte.

Image data for writing by printer 100 can be processed by a raster image processor (RIP; not shown), which can include a color separation screen generator or generators. The output of the RIP can be stored in frame or line buffers for transmission of the color separation print data to each of respective LED writers, e.g. for black (K), yellow (Y), magenta (M), cyan (C), and red (R), respectively. The RIP or color separation screen generator can be a part of printer 100 or remote therefrom. Image data processed by the RIP can be obtained from a color document scanner or a digital camera or produced by a computer or from a memory or network which typically includes image data representing a continuous image that needs to be reprocessed into halftone image data in order to be adequately represented by the printer. The RIP can perform image processing processes, e.g. color correction, in order to obtain the desired color print. Color image data is separated into the respective colors and converted by the RIP to halftone dot image data in the respective color using matrices, which comprise desired screen angles (measured counterclockwise from rightward, the +X direction) and screen rulings. The RIP can be a suitably-programmed computer or logic device and is adapted to employ stored or computed matrices and templates for processing separated color image data into rendered image data in the form of halftone information suitable for printing. These matrices can include a screen pattern memory (SPM).

Various parameters of the components of a printing module (e.g., printing module 31) can be selected to control the operation of printer 100. In an embodiment, charger 21 is a corona charger including a grid between the corona wires (not shown) and photoreceptor 25. Voltage source 21a applies a voltage to the grid to control charging of photoreceptor 25. In an embodiment, a voltage bias is applied to toning station 23 by voltage source 23a to control the electric field, and thus the rate of toner transfer, from toning station 23 to photoreceptor 25. In an embodiment, a voltage is applied to a conductive base layer of photoreceptor 25 by voltage source 25a before development, that is, before toner is applied to photoreceptor 25 by toning station 23. The applied voltage can be zero; the base layer can be grounded. This also provides control over the rate of toner deposition during development. In an embodiment, the exposure applied by exposure subsystem 22 to photoreceptor 25 is controlled by LCU 99 to produce a latent image corresponding to the desired print image. Each of these parameters can be changed, as described below.

Further details regarding printer 100 are provided in U.S. Pat. No. 6,608,641, issued on Aug. 19, 2003, to Peter S. Alexandrovich et al., and in U.S. Publication No. 2006/0133870, published on Jun. 22, 2006, by Yee S. Ng et al., the disclosures of which are incorporated herein by reference.

Figure 2:
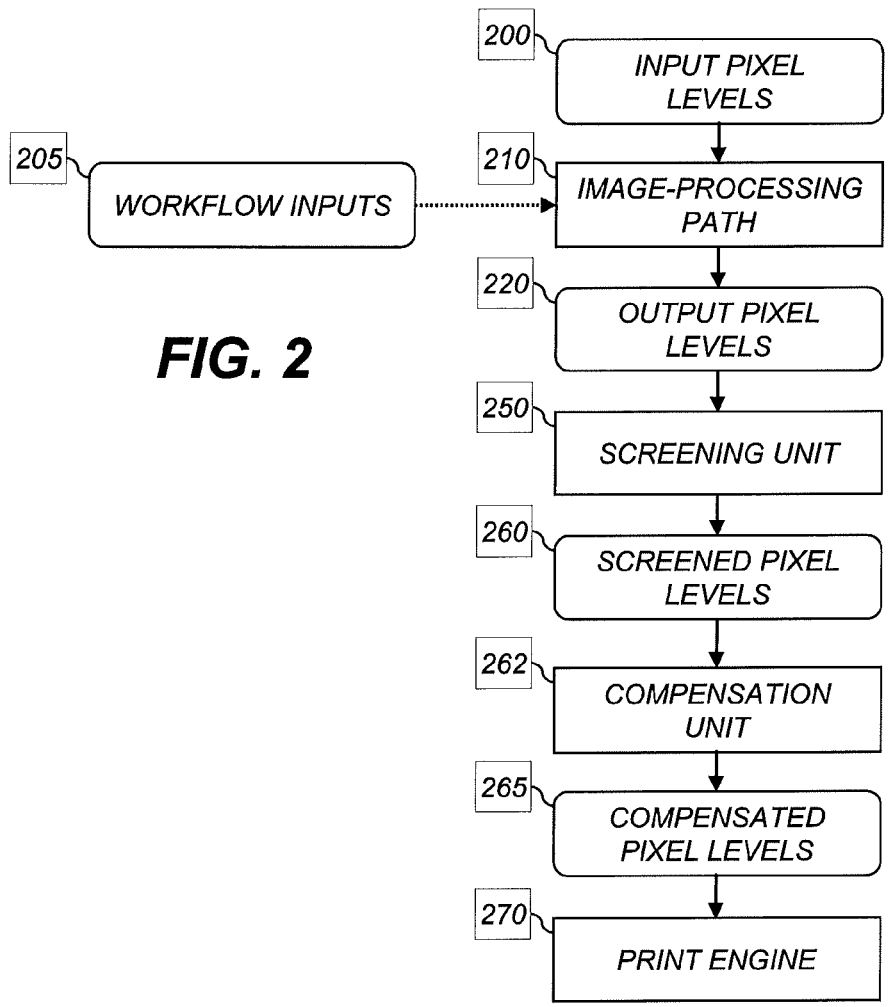
FIG. 2 is a schematic of a data-processing path useful with various embodiments.

FIG. 2 shows a data-processing path useful with various embodiments, and defines several terms used herein. Printer 100 (FIG. 1) or corresponding electronics (e.g. the DFE or RIP), described herein, operate this datapath to produce image data corresponding to exposure to be applied to a photoreceptor, as described above. The datapath can be partitioned in various ways between the DFE and the print engine, as is known in the image-processing art.

The following discussion relates to a single pixel; in operation, data processing takes place for a plurality of pixels that together compose an image. The term "resolution" herein refers to spatial resolution, e.g. in cycles per degree. The term "bit depth" refers to the range and precision of values. Each set of pixel levels has a corresponding set of pixel locations. Each pixel location is the set of coordinates on the surface of receiver 42 (FIG. 1) at which an amount of toner corresponding to the respective pixel level should be applied.

Printer 100 receives input pixel levels 200. These can be any level known in the art, e.g. sRGB code values (0 . . . 255) for red, green, and blue (R, G, B) color channels. There is one pixel level for each color channel. Input pixel levels 200 can be in an additive or subtractive space. Image-processing path 210 converts input pixel levels 200 to output pixel levels 220, which can be cyan, magenta, yellow (CMY); cyan, magenta, yellow, black (CMYK); or values in another subtractive color space. This conversion can be part of the color-management system discussed above. Output pixel level 220 can be linear or non-linear with respect to exposure, L*, or other factors known in the art.

Image-processing path 210 transforms input pixel levels 200 of input color channels (e.g. R) in an input color space (e.g. sRGB) to output pixel levels 220 of output color channels (e.g. C) in an output color space (e.g. CMYK). In various embodiments, image-processing path 210 transforms input pixel levels 200 to desired CIELAB (CIE 1976 L*a*b*; CIE Pub. 15: 2004, 3rd. ed., §8.2.1) values or ICC PCS (Profile Connection Space) LAB values, and thence optionally to values representing the desired color in a wide-gamut encoding such as ROMM RGB. The CIELAB, PCS LAB or ROMM RGB values are then transformed to device-dependent CMYK values to maintain the desired colorimetry of the pixels. Image-processing path 210 can use optional workflow inputs 205, e.g. ICC profiles of the image and the printer 100, to calculate the output pixel levels 220. RGB can be converted to CMYK according to the Specifications for Web Offset Publications (SWOP; ANSI CGATS TR001 and CGATS.6), Euroscale (ISO 2846-1:2006 and ISO 12647), or other CMYK standards. Part of an embodiment of image-processing path 210 is shown in FIG. 2, discussed below.

Input pixels are associated with an input resolution in pixels per inch (ippi, input pixels per inch), and output pixels with an output resolution (oppi). Image-processing path 210 scales or crops the image, e.g. using bicubic interpolation, to change resolutions when ippi≠oppi. The following steps in the path (output pixel levels 220, screened pixel levels 260) are preferably also performed at oppi, but each can be a different resolution, with suitable scaling or cropping operations between them.

Screening unit 250 calculates screened pixel levels 260 from output pixel levels 220. Screening unit 250 can perform continuous-tone (processing), halftone, multitone, or multilevel halftone processing, and can include a screening memory or dither bitmaps. Screened pixel levels 260 are at the bit depth required by compensation unit 262.

Compensation unit 262, described below with respect to FIGS. 4-5B, transforms screened pixel levels 260 and locations into compensated pixel levels 265 and locations. The compensated pixel levels 265 and locations are provided to print engine 270.

Print engine 270 represents the subsystems in printer 100 that apply an amount of toner corresponding to the compensated pixel levels to a receiver 42 (FIG. 1) at the respective pixel locations. Examples of these subsystems are described above with reference to FIG. 1. At each compensated pixel location, exposure corresponding to the respective compensated pixel level 265 is provided. Print engine 270 can also subsample or perform other processing on compensated pixel levels 265 and locations to provide engine pixel levels and locations.

Figure 3:
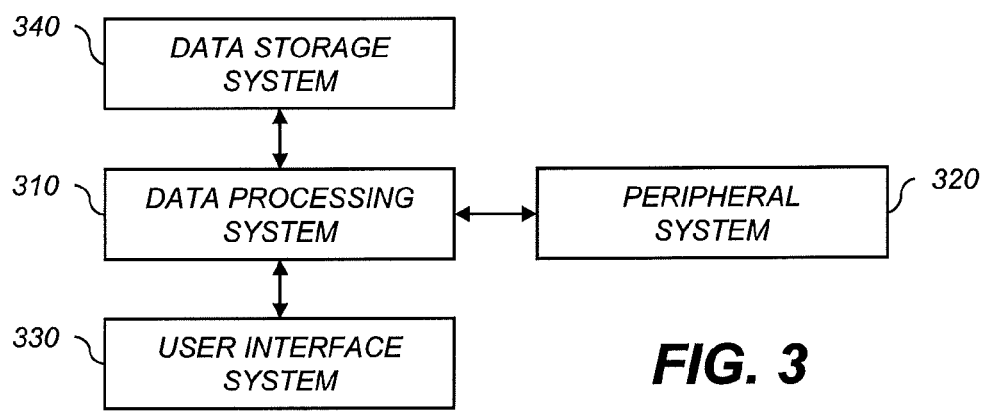
FIG. 3 is a high-level diagram showing the components of a processing system useful with various embodiments.

FIG. 3 is a high-level diagram showing the components of a processing system useful with various embodiments. The system includes a data processing system 310, a peripheral system 320, a user interface system 330, and a data storage system 340. Peripheral system 320, user interface system 330 and data storage system 340 are communicatively connected to data processing system 310.

Data processing system 310 includes one or more data processing devices that implement the processes of various embodiments, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 340 includes one or more processor-accessible memories configured to store information, including the information needed to execute the processes of the various embodiments, including the example processes described herein. Data storage system 340 can be a distributed processor-accessible memory system including multiple processor-accessible memories communicatively connected to data processing system 310 via a plurality of computers or devices. On the other hand, data storage system 340 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors at all. In this regard, although the data storage system 340 is shown separately from data processing system 310, one skilled in the art will appreciate that data storage system 340 can be stored completely or partially within data processing system 310. Further in this regard, although peripheral system 320 and user interface system 330 are shown separately from data processing system 310, one skilled in the art will appreciate that one or both of such systems can be stored completely or partially within data processing system 310.

Peripheral system 320 can include one or more devices configured to provide digital content records to data processing system 310. For example, peripheral system 320 can include digital still cameras, digital video cameras, cellular phones, or other data processors. Data processing system 310, upon receipt of digital content records from a device in peripheral system 320, can store such digital content records in data storage system 340. Peripheral system 320 can also include a printer interface for causing a printer to produce output corresponding to digital content records stored in data storage system 340 or produced by data processing system 310.

User interface system 330 can include a mouse, a keyboard, another computer, or any device or combination of devices from which data is input to data processing system 310. In this regard, although peripheral system 320 is shown separately from user interface system 330, peripheral system 320 can be included as part of user interface system 330.

User interface system 330 also can include a display device, a processor-accessible memory, or any device or combination of devices to which data is output by data processing system 310. In this regard, if user interface system 330 includes a processor-accessible memory, such memory can be part of data storage system 340 even though user interface system 330 and data storage system 340 are shown separately in FIG. 1.

Figure 4:
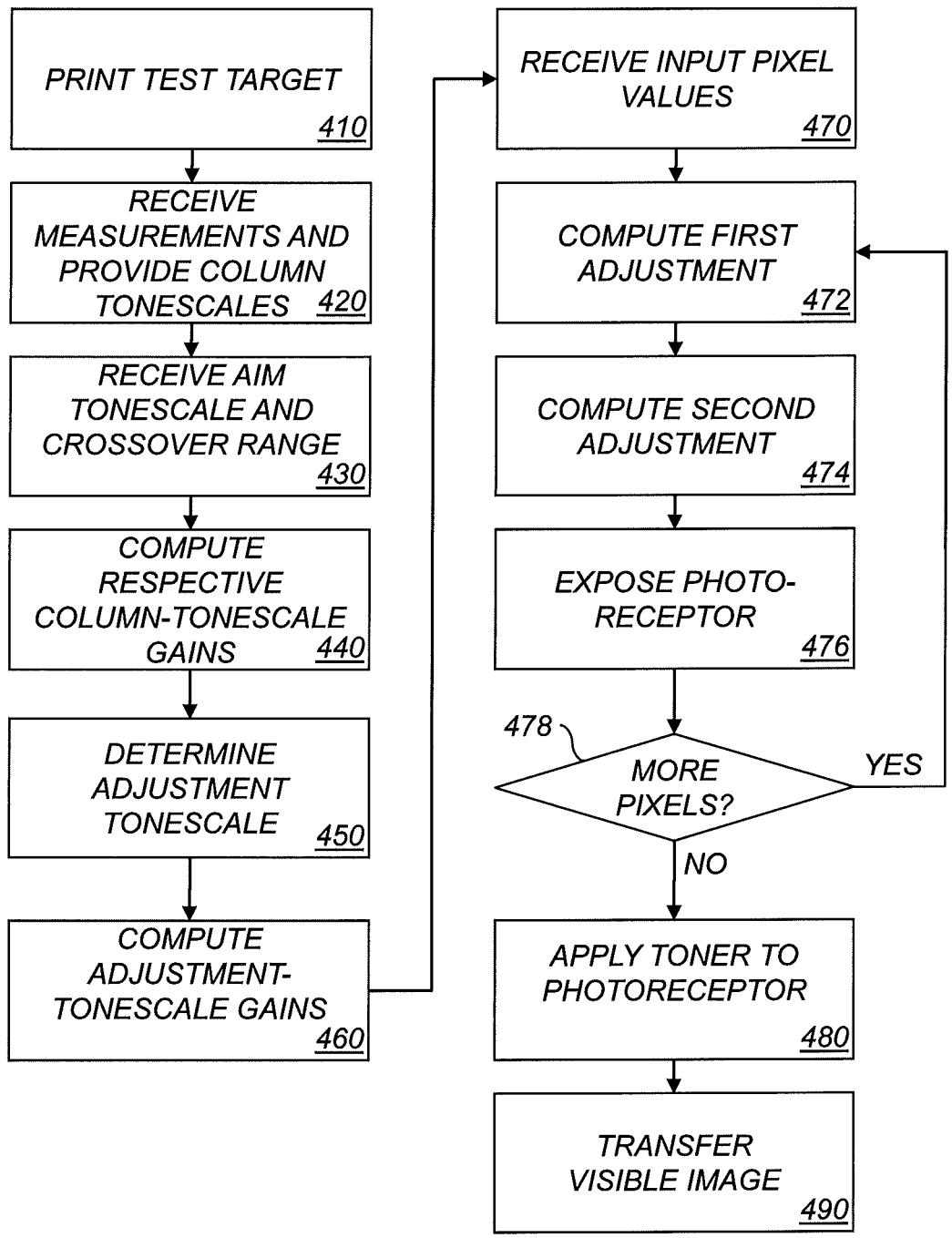
FIG. 4 is a flowchart of a compensation method.

FIG. 4 is a flowchart of a method of printing an image on a receiver 42 (FIG. 1) according to various embodiments. Printing is performed using an electrophotographic printer adapted to deposit toner in a plurality of columns on a receiver. Processing begins with step 410.

In step 410, a test target having a plurality of densities in each column is printed on a first receiver. Step 410 is followed by step 420.

In step 420, measurements of the test target on the first receiver are received to provide a respective column tonescale for each column. Measurements can be taken with a flatbed scanner or densitometer. Step 420 is followed by step 430. More details about the measurement are discussed below with respect to FIG. 5A. Measurements can be taken automatically and received from a measurement subsystem (e.g., an inline line-scan camera) under control of a processor, or can be received from a scanner after an operator scans the test target on the scanner.

In step 430, an aim tonescale and a crossover range of pixel levels are received. The aim tonescale describes a relationship between input pixel values and desired exposure of the photoreceptor 25 (FIG. 1), and hence between input pixel values and density. Step 430 is followed by step 440.

In step 440, a respective column-tonescale gain is computed for each column. The computation is performed so that the respective first product of each column-tonescale gain and its respective column tonescale intersects the aim tonescale in the crossover range (and, optionally, more than once, or outside the crossover range). This step provides compensation for overall gain errors in the optical path from a light source to a given column of the photoreceptor. Radiometric measurements of the optical power of a light source at each column can be used in computing the column-tonescale gains. Step 440 is followed by step 450.

In step 450, an adjustment tonescale is determined using the respective residual errors between the aim tonescale and each first product. The adjustment tonescale changes sign within the crossover range. The adjustment tonescale provides compensation for errors not correctable by a simple gain of the aim tonescale. In other embodiments, multiple adjustment tonescales can be used. Step 450 is followed by step 460.

In step 460, a respective adjustment-tonescale gain for each column is computed using the respective first product, the adjustment tonescale, and the aim tonescale. The adjustment-tonescale gain is computed so that the combination of the respective first product and the second product of the adjustment tonescale and the respective adjustment-tonescale gain will approximate the aim tonescale as closely as possible. This can be done by mathematical optimization, regression, or other best-fit or fitting techniques. Step 460 is followed by step 470.

In step 470, a plurality of input pixel values is received. Steps 472, 474, and 476 are performed for each pixel value.

In step 472, a first adjustment is computed by multiplying the value of the aim tonescale at the pixel value by the column-tonescale gain for the corresponding column (i.e., selecting the value of the first product for the input pixel value). Step 472 is followed by step 474.

In step 474, a second adjustment is computed by multiplying the value of the adjustment tonescale at the pixel value by the adjustment-tonescale gain for the corresponding column (i.e., selecting the value of the second product for the input pixel value). Step 474 is followed by step 476.

In step 476, the photoreceptor is exposed in a respective pixel area. The amount of light or other actinic radiation used for the exposure corresponds to the first and second adjustments. The first and second adjustments can be combined by adding, and exposure can be provided at a fixed optical power for an amount of time corresponding to the sum. Step 476 is followed by decision step 478.

At decision step 478, if pixels remain to be processed, the next step is step 472. If not, the next step is step 480.

In step 480, toner is applied to the photoreceptor to form thereon a visible image corresponding to the exposure of the photoreceptor. Step 480 is followed by step 490.

In step 490, the visible image is transferred to a second receiver so that a print corrected for nonuniformity is produced.

In other embodiments (not shown), third, fourth, or additional adjustments are also used along with the first and second adjustments. Each adjustment has a Tn table and a per-column Gn gain. Adder 578 (FIG. 5A) can have any number of inputs.

In other embodiments (not shown), multiple aim tonescales are used. For example, aim tonescales with different midscale contrasts (slope near the center) can be used. These methods of printing an image on a receiver using an electrophotographic printer adapted to deposit toner in a plurality of columns on the receiver including printing a test target and receiving measurements of the test target as described above. A plurality of aim tonescales are determined, e.g., by binning the column tonescales according to their first derivative at the median measured density, and scaling a master tonescale to produce an aim tonescale for each bin corresponding to the mean first derivative of the column tonescales in that bin. One of the aim tonescales is selected for each column, e.g., using the binning. A respective column-tonescale gain is computed for each column so that the respective first product of each column-tonescale gain and its respective column tonescale approximates the selected aim tonescale within a selected tolerance (e.g., RMS error or maximum deviation at a given x-coordinate).

A plurality of input pixel values is received, and, for each pixel value, an adjusted pixel value is computed and the photoreceptor is exposed. The adjusted pixel value is computed by multiplying the value of the selected aim tonescale at the input pixel value by the column-tonescale gain for the corresponding column. The photoreceptor is exposed in a respective pixel area to light or other actinic radiation corresponding to the adjusted pixel value. Toner is applied to the photoreceptor as described above to form thereon a visible image corresponding to the exposure of the photoreceptor. The visible image is then transferred to a second receiver so that a print corrected for nonuniformity is produced.

Figure 5A:
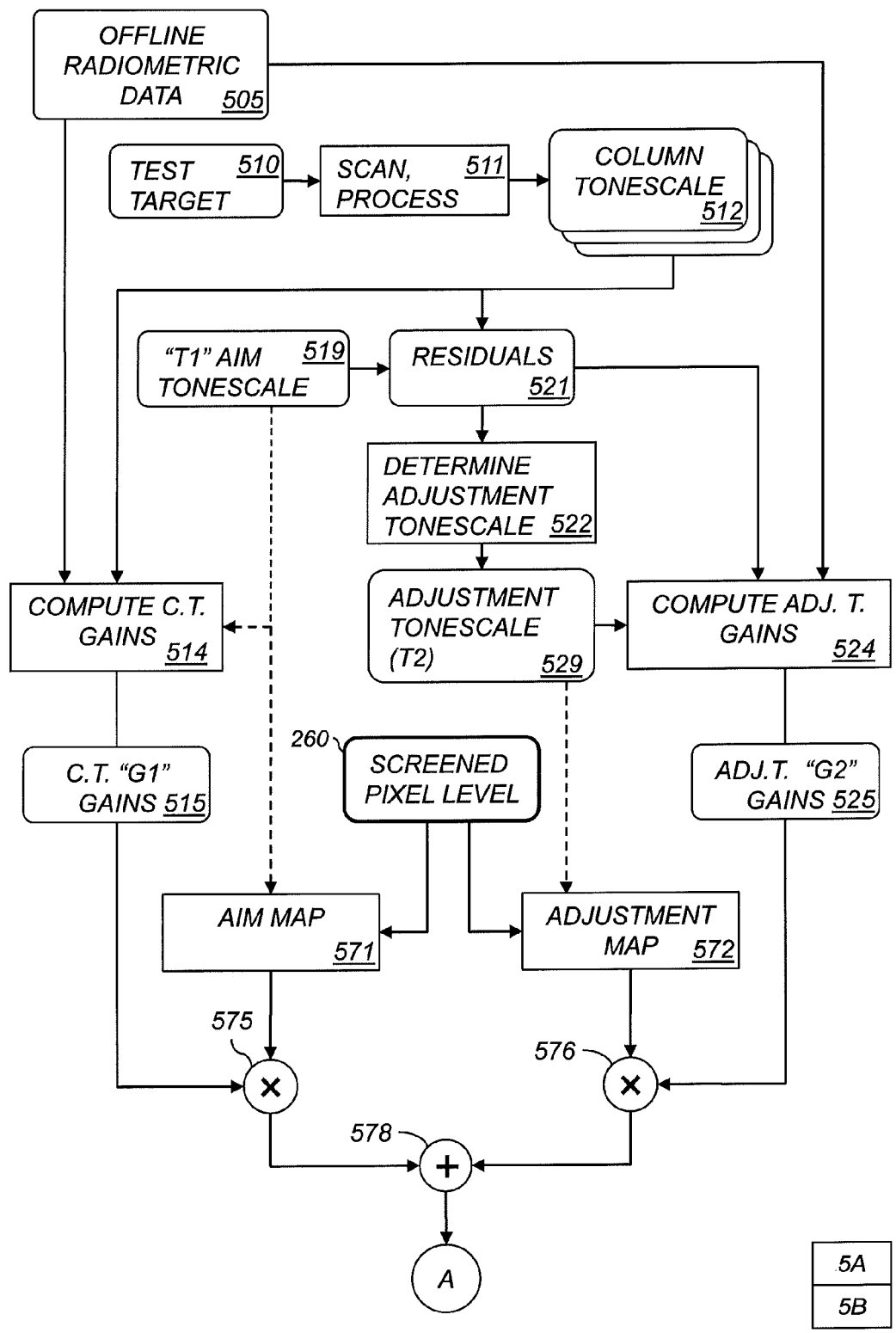
FIGS. 5A-5B are a dataflow diagram of compensation.
Figure 5B:
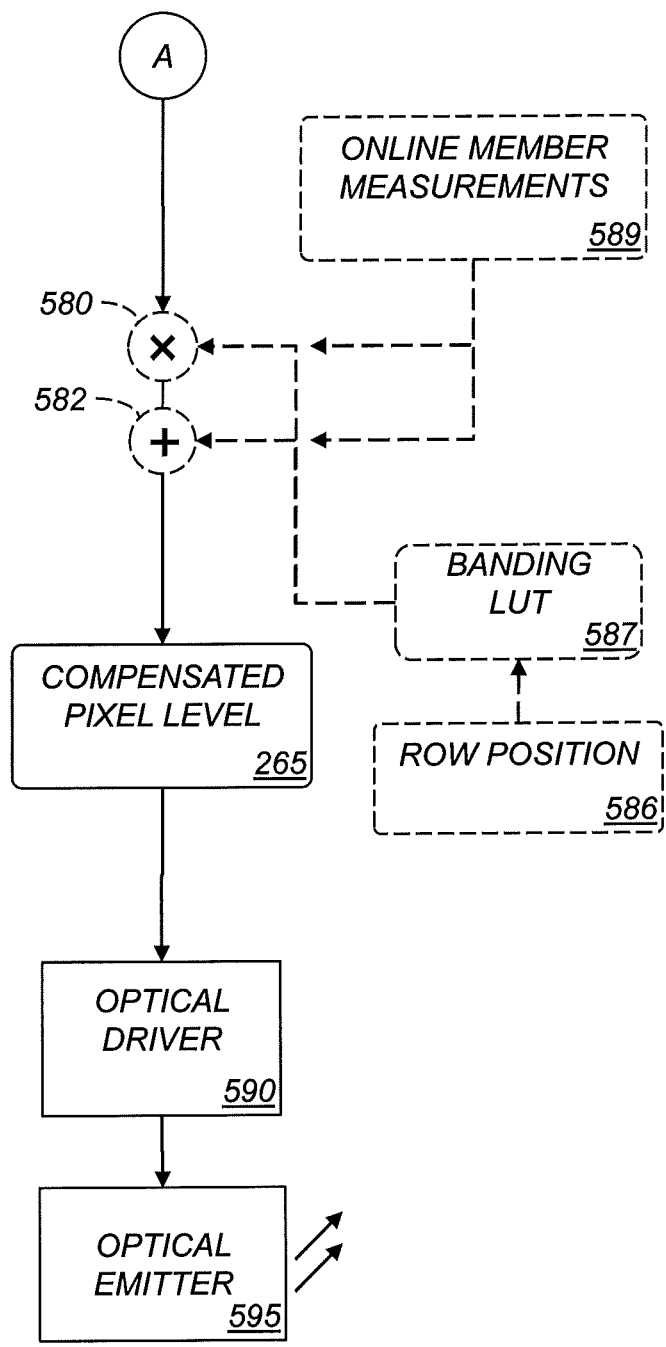

FIGS. 5A-5B are a dataflow diagram of methods of nonuniformity compensation according to various embodiments. The diagram shows the generation of tables in a calibration process ("off-line"), and the processing of one pixel ("online" or "runtime"); each pixel is processed through the same steps. Input values to the calibration process are test target 510 and offline radiometric data 505 (both on FIG. 5A). Inputs to the runtime process are screened pixel level 260 (FIG. 5A) and, optionally, measurements 589 (FIG. 5B). The calibration process will be described first. The calibration process can be performed for each color channel individually, or for combinations of channels, and the data for one channel (e.g., K) can be used to compensate other channels.

The processes will be discussed with regard to a particular hardware configuration. Others of the possible hardware configurations are discussed below. In this example, a constant-current LED writer is used. The term "writer" in these embodiments refers to an array of LEDs and corresponding optical elements adapted to image-wise expose a photoreceptor. Optical elements can include one or more SELFOC or other lens(es). The writer can be full-page-width, wider, or narrower. One or more writers can be arranged to expose a particular photoreceptor, sequentially or simultaneously. As described herein, optical driver 590 (FIG. 5B) receives an exposure signal linear with on-time.

Density of an EP print is correlated with exposure, which is proportional to optical power multiplied by exposure time. Optical driver 590 is a constant-current driver circuit and optical emitter 595 is an LED (both are on FIG. 5B). They cooperate to provide a selected optical power that is substantially constant, except for thermal effects, lens variations (e.g., nonuniformity between lens rods in a SELFOC lens, or $\cos^4$ falloff in a convex lens) and noise (e.g., Johnson noise), regardless of the desired density. The optical power is provided for an amount of time correlated to the desired density. To summarize, for a given engine pixel imaged by the print engine:

$$\text{Exposure} = \text{Optical Power}_{const} \times \text{Time(engine pixel level)} \propto \text{Drive Current}_{const} \times \text{Time(engine pixel level)}.$$

In this example, density has a positive correlation with density: more exposure on an engine pixel results in a higher-density (darker) spot for that pixel. Desired exposure times can be selected as described in U.S. Pat. No. 5,200,765, issued Apr. 6, 1993 to Tai, U.S. Pat. No. 5,493,322, issued Feb. 20, 1996 to Ng et al., U.S. Pat. No. 5,546,165, issued Aug. 13, 1996 to Rushing et al., or U.S. Pat. No. 5,666,150, issued Sep. 9, 1997 to Ajewole, the disclosures of all of which are incorporated herein by reference. The disclosure of U.S. Pat. No. 5,914,744, issued Jun. 22, 1999 to Ng, is also incorporated herein by reference.

Data 505 are offline-measured radiometric data of light output or intensity for each LED, measured at 100% duty cycle at the selected drive current. Light output can be measured as radiant power in microwatts. Data 505 can be expressed as relative output power, with 1.0 being the average output of all LEDs, or a selected aim output. Data 505 are provided to steps 514 and 524.

Target 510 is a test target. Target 510 includes a plurality of test patches or test areas (each not necessarily contiguous; not necessarily immediately adjacent), each patch extending across a respective plurality of columns and having a respective aim density level, wherein at least two of the patches on the test target have different respective aim density levels. The target has a plurality of density levels for each column. Each column is written by one LED, so the target has a plurality of density levels for each LED. Target 510 is provided to step 511.

In step 511, the target is scanned and processed. The printed test target is measured, e.g. using a flatbed scanner or area densitometer, to produced measured density data including a respective column tonescale 512 for each column in a first selected set of the columns, each tonescale being determined using the data from a respective selected set of the test patches. That is, for the LEDs of interest, which can be some or all of the LEDs on the writer, several densities are measured to produce a column tonescale. Step 511 produces column tonescales 512. An example of a target and scanning a target is found in U.S. Patent Publication 20100097657, the disclosure of which is incorporated herein by reference.

Column tonescales 512 map on-time (hence exposure) of the LED writing a particular column to the resulting density in that column, for that exposure. Column tonescales 512 are provided to step 514, and are used to determine residuals 521.

Aim tonescale 519 is a selected tonescale relating image data to exposure time, and thus to density produced. It models the response of the photoreceptor 25, toning station 23, fuser 60, and other intervening components, i.e., the effects after the writer. It can be an S-curve to provide pleasing print images 38. Aim tonescale 519 can be selected by one skilled in the art according to industry standards or experimental evaluation. Aim tonescale 519 can be determined by determining the relationship between on-time and density from the printer using empirical measurements. A desired mapping from image data to density is then backed out of this relationship to obtain the corresponding relationship from image data to on-time. In an embodiment, the desired mapping from image data to density is selected to provide a roughly equivalent density or lightness increase for each increase in image data value, so that, e.g., the density difference between pixel level 129 and pixel level 128 is approximately equal to the density difference between pixel level 128 and pixel level 127. That is, 0-255 map to the exposures to provide densities of $D_{min}$–$D_{max}$. $D_{min}$ is the reflective density of the paper alone, unprinted, and can be <0.5. $D_{min}$ is the maximum density that can be produced by the printer in the color channel of the pixel, and can be >2.

Aim tonescale 519 is provided to aim mapping step 571 (shown with a dashed line for clarity) and is used to compute residuals 521. Aim tonescale 519 also includes a crossover range of image data values that can be selected by one skilled in the art, as described above with reference to FIG. 4. The crossover range can be a range of pixel levels, e.g., [118, 138]. Each tonescale described herein, including aim tonescales 519 and column tonescales 512, can include from 2-256 points, or more. Tonescales can be expressed as LUTs or functions, and interpolation from key points can be used instead of storing all values.

In step 514, a processor automatically calculates a respective column-tonescale gain ("G1") for each of the pixels in the first selected set (not everything measured has to be used in the computation). G1 is computed so that the respective first product of each column-tonescale gain G1 value 515 and its respective column tonescale 512 intersects the aim tonescale 519 in the crossover range. Therefore, there is one G1 value 515 for each column (each LED). If no scan is available, each G1 value 515 can be set to the reciprocal of the relative LED output (e.g., average output=1.0) from radiometric data 505. Otherwise, the relative LED output can used to determine which portion of a column tonescale's deviation from aim is due to the LED and which portion is due to other factors. The G1 values 515 (column tonescale gains, or "C.T. gains" 515) from step 514 are provided to multiplier 575 and are used for correction, as described below.

Residuals 521 represent the deviation from aim tonescale 519 of the G1 correction. Residuals 521 can be computed by multiplying each column tonescale 512 by the corresponding G1 value 515 from step 514, and subtracting aim tonescale 519 from the result. Residuals 521 are provided to steps 522 and 524.

In step 522, the processor automatically calculates an adjustment tonescale 529 using the determined respective residual error 521 between each first product and aim tonescale 519, as described above. The processor extracts the component of the respective residual errors 521 due to pixel level. Adjustment tonescale 529 maps or relates pixel level to an adjustment in exposure (on-time) to more closely reproduce the desired density for that pixel level. A single adjustment tonescale 529 can be used for all LEDs (columns), or different adjustment tonescales 529 can be used for some LEDs than for others. Adjustment tonescale 529 changes sign within the crossover range of aim tonescale 519. Adjustment tonescale 529 is provided to mapping step 572 (shown with a dashed line for clarity), discussed below, and to step 524.

In step 524, the processor automatically calculates a respective adjustment-tonescale gain 525 "G2" for each of the pixels in the first selected set. Each respective adjustment-tonescale gain 525 relates the respective residual error for that column to the adjustment tonescale 529. The adjustment tonescale 529 can be determined by mathematically optimizing, regressing, or fitting to reduce error over all LEDs for which a given adjustment tonescale 522 is used. The G2 value 525 for a given column applies the appropriate amount of correction from adjustment tonescale 522 for a given LED. If no column tonescales 512 are available, all G2 are set to 0. Otherwise, radiometric data 505 are used as described above for step 514. G2 values 525 are provided to multiplier 576.

Per-pixel processing begins with screened pixel level 260 for the pixel being processed. Pixels in each color channel are processed independently. In this example, screened pixel level 260 is a particular eight-bit value that maps nonlinearly to the desired density. In various embodiments, the possible values (e.g., 256 in number) of screened pixel level 260 represent values of density from $D_{min}$ to $D_{max}$, inclusive, evenly spaced in CIELAB L*. Other perceptually-uniform or -non-uniform spaces can also be used. Level 260 is a screened pixel level for a pixel in a particular column. Level 260 is provided to step 571 and step 572.

In step 571, level 260 is mapped through aim tonescale 519 ("T1"). Step 571 is followed by multiplier 575. In step 572, level 260 is mapped through the adjustment tonescale 529 ("T2"). Step 572 is followed by multiplier 576. The outputs of steps 571 and 572 are values that are linear with exposure, and therefore linear with on-time. These values can have a higher bit depth than screened pixel level 260, e.g., 9, 10, 11, 12, or more bits.

Multiplier 575 multiplies the T1-mapped (aim-tonescale-adjusted) pixel level by the G1 gain 515 for the corresponding column. The result of multiplier 575 is provided to adder 578.

Multiplier 576 multiplies the T2-mapped (adjustment-tonescale-mapped) pixel level by the G2 gain 525 for the corresponding column. The result of multiplier 576 is provided to adder 578.

Adder 578 adds its inputs, which are the products from multipliers 575, 576. The result of adder 578 can be a compensated pixel level 265 (FIG. 5B), or can be processed through optional multiplier 580 and adder 582 to produce compensated pixel level 265 (all in FIG. 5B).

Referring to FIG. 5B, the output of adder 578 is received from FIG. 5A. In an example not performing banding correction (correction for variations along the in-track direction), multiplier 580 and adder 582 are not used. Compensated pixel level 265 from adder 578 (FIG. 5A) is provided to optical driver 590. In an embodiment, screened pixel level 260 has eight bits in a perceptually-uniform space, and compensated pixel level 265 has eleven bits in a space linear with on-time.

Optical driver 590 provides control signals to optical emitter 595. For example, optical driver can produce a pulse of the desired drive current with a width in time corresponding to compensated pixel level 265. Compensated pixel level 265 can be the number of cycles of a master clock (e.g., running at 20 MHz) for which the pulse should be on. Pulses for multiple pixels in a given row can be aligned left, right, or center in time with each other, or otherwise initiated or terminated at times spread apart to reduce voltage droop on the power supply for optical driver 590 and inductive kick on the power lines. Optical driver 590 can include sensors and circuitry or logic to compensate for changes in output due to temperature and other environmental factors and operational variables. For example, current can be increased in a known proportion to temperature.

Optical emitter 595 emits light to expose photoreceptor 25 (FIG. 1) in an engine pixel area. In this example, optical emitter 595 is an LED.

In embodiments that perform banding correction, multiplier 580 and adder 582 apply gain and offset, respectively, to the output of adder 578 (FIG. 5A) to provide compensated pixel level 265. Gain alone, or offset alone, or both can be used. In one example, measurements are taken of various members (e.g., photoreceptor 25 or toning station 23, FIG. 1) while the printer is operating. The measured values are online member measurements 589. Measurements 589 are correlated to known effects of variations to determine the gain and offset. For example, a measurement of toning station run-out can indicate that exposure should be increased (gain>1 or offset>0) when toning station 23 is farther from photoreceptor 25, and reduced (gain<1 or offset<0) when toning station 23 is closer to photoreceptor 25.

Alternatively, the row position 586 of the current pixel can be used as an index to banding LUT 587. LUT 587 can hold gain and offset values. LUT 587 can be preloaded in the printer based on empirical tests. In various embodiments, encoders or a memory are provided to track the rotational position of members across receivers.

In other embodiments, LUT 587 can be two-dimensional, indexed by row (in-track) and column (cross-track). Each cell can include a gain or offset, and a selection of a tonescale or gain to use. For example, different adjustment tonescales 529 (FIG. 5A), adjustment-tonescale gains 525, or column-tonescale gains 515 can be provided for different columns. LUT 587, or a separate LUT, can select which tonescale(s), gain(s) or gain set(s) to use for a particular column.

Other hardware configurations can also be used. For example, a write-white configuration can be used in which the shortest on-time gives $D_{max}$ and the longest on-time gives $D_{min}$. A laser and raster optical scanner (ROS) can be used instead of an LED array. In various embodiments, the drive current of each LED or of each bank of LEDs (e.g., 192 LEDs) can be adjusted to make optical power more uniform between LEDs. Optical driver 590 can take as input compensated pixel levels 265 having any number of bits, including >8 bits. Any LUT described herein can be implemented as a function or a segmented approximation of a function (e.g., using linear, quadratic, or B-spline segments).

Other algorithms can also be used. In various embodiments, adjustment tonescale 529 (FIG. 5A) is predetermined. G2 values 525 (FIG. 5A) can be selected to compensate for residuals compared to the predetermined adjustment tonescale 529, and adjusted based on the relative output power from radiometric data 505. A new target 510 can be printed periodically to compensate for changes in the printer's operation over time. Adjustment tonescale 529, G1 gains 515, G2 gains 525 (all FIG. 5A), or any combination thereof, can be updated with the results of a new scan. Coefficients in any of the tables described herein can be binned and interpolated to reduce the amount of space used.

Figure 6:
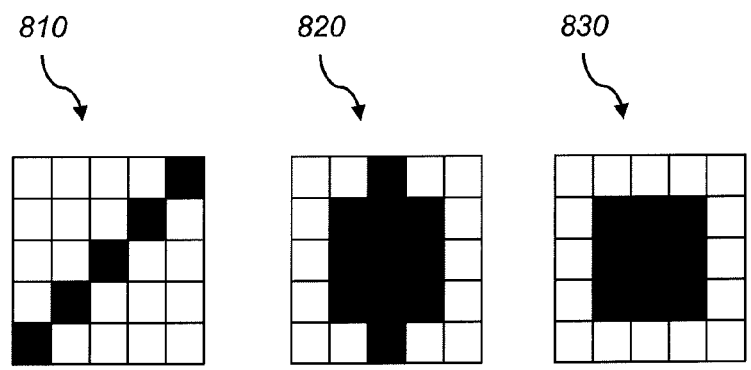
FIG. 6 shows representative dot shapes.

FIG. 6 shows three representative dot shapes: line dot shape 810, elliptical dot shape 820, and square dot shape 830. In an embodiment, the selected screening pattern stored in a screen memory includes a plurality of different dot shapes, and the screening unit 250 (FIG. 2) selects one of the dot shapes.

Figure 7:
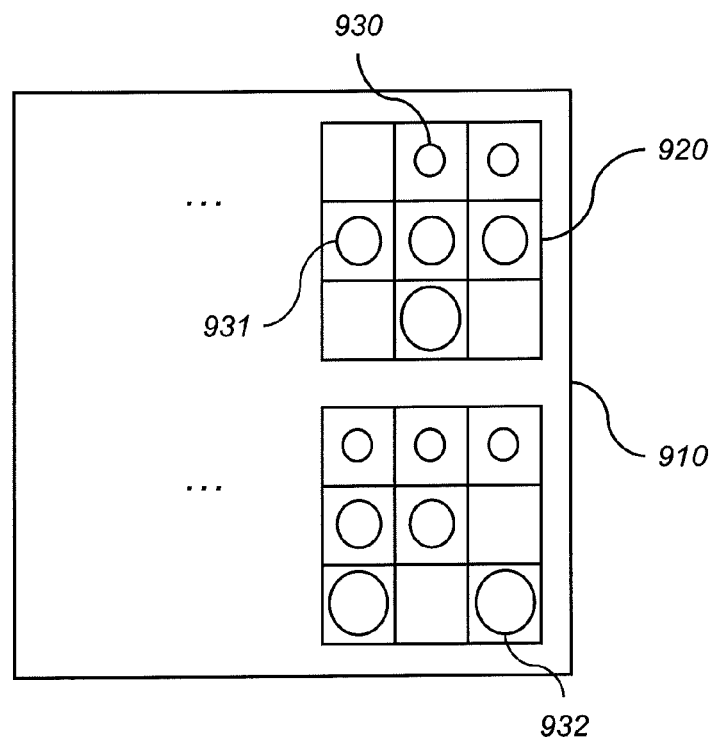
FIG. 7 shows a representative screening pattern and representative engine pixel sizes.

Referring to FIG. 7, there is shown an example layout of a screening pattern. An image is divided into one or more tiles 910, each containing one or more screen cells 920, each containing one or more engine pixels 930. Each tile 910 is a group of cells which together form a rectangle, and the rectangles of all tiles 910 pack together to tile the plane of the image. The leading edge of each tile 910, as the receiver moves through printer 100, is parallel to the fast-scan axis of printer 100.

Each screen cell 920 is an area of the image in which one halftone dot can be formed, or an area which packs together with adjacent screen cells 920 to define the area in which one dot can be formed. Each cell 920 is a group of engine pixels 930.

Each engine pixel 930 corresponds to an area in which a selected exposure is applied to photoreceptor 25 (FIG. 1) by exposure subsystem 22 (FIG. 1). In various embodiments, for laser writers, one engine pixel 930 is a discrete site at which a desired laser intensity is directed; for LED writers, one engine pixel 930 is the area on which light from one LED falls during a period of time in which photoreceptor 25 moves less than a selected distance in the slow-scan direction. For example, the slow-scan direction is divided into a plurality of exposure lines, and one engine pixel is the area exposed by an LED while the photoreceptor 25 moves one exposure line, or ½ exposure line, or a selected amount less than or equal to one exposure line. Although some of the light intended for a selected engine pixel can provide some exposure to adjacent pixels, each engine pixel 930 is logically distinct from all others, and can be treated independently of all others by the image-processing path.

In conventional binary halftoning systems, each engine pixel 930 is either exposed with a fixed exposure or not exposed at all. In multi-toning or multi-level halftoning systems, each engine pixel 930 can be exposed at any of at least 3 levels, including no exposure, full exposure, and at least one intermediate level of exposure. Different exposure levels of the engine pixels 930 can result in different sizes of the toner area of the developed image on the photoreceptor. This effect is shown by different sizes of engine pixels 930. In this example, each engine pixel can be unexposed, or can be exposed at any of three different engine-pixel levels, as shown by engine pixels 930, 931 and 932 (small, medium, and large, respectively).

Referring to FIGS. 8A-F, one type of non-uniformity is the vertical streak (on a portrait-oriented receiver). As described above, print engine 270 (FIG. 2) has a fast-scan direction (cross-track) and a slow-scan direction (in-track) that are preferably perpendicular to each other.

Figure 8A:
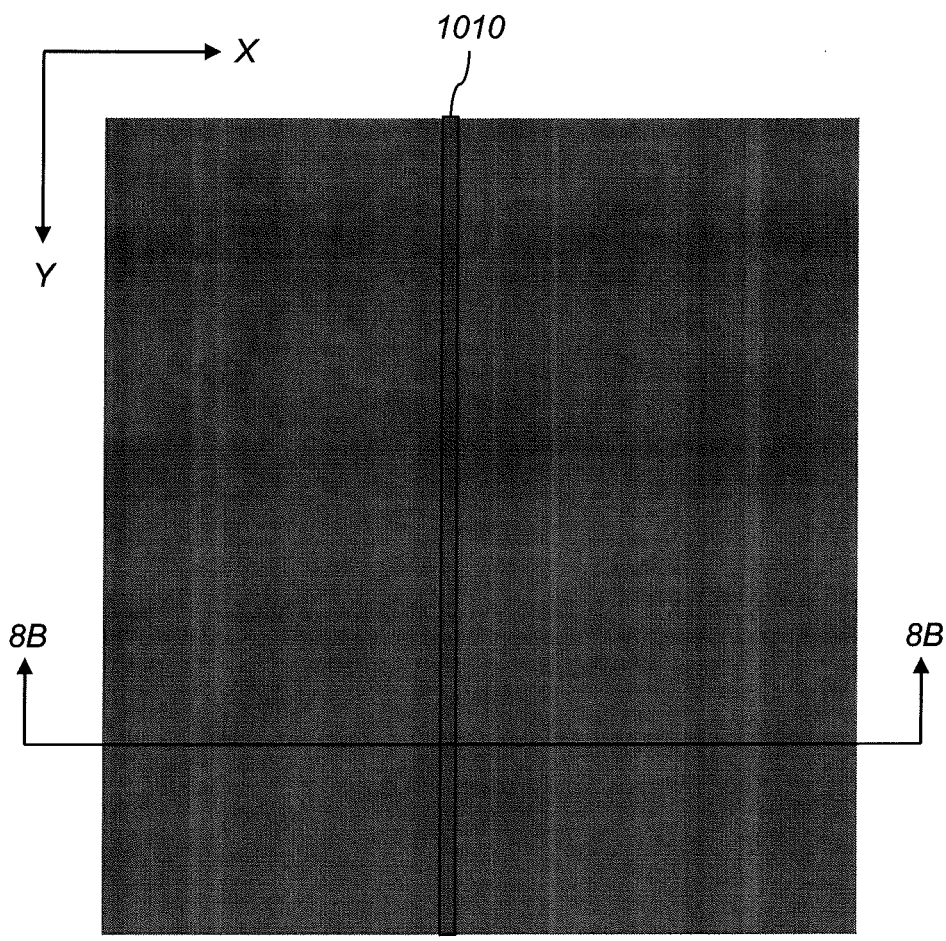
FIG. 8A shows a representative streak pattern.

FIG. 8A shows a representative streak pattern. The streaks extend in the slow-scan direction (Y), and have relatively constant width in the fast-scan direction (X). FIG. 8A was intended to be a uniform gray field, but the streaks are non-uniformities which can be lighter or darker than the desired color. The non-uniformity of print engine 270 (FIG. 2) has a bounding parallelogram 1010 (here, a rectangle) with sides parallel to the fast-scan (X) and slow-scan (Y) directions, and the sides of bounding parallelogram 1010 are longer in the slow-scan direction (Y) than the fast-scan direction (X). Therefore, the non-uniformity is a vertical streak. Specifically, the print engine 270 applies more or less toner than an amount corresponding to the engine pixel level to a selected area (e.g. bounding parallelogram 1010), whereby the non-uniformity is a streak in the selected area. Streaks can also extend in the fast-scan direction; such streaks are typically referred to as "banding artifacts." Streaks can also extend in other directions on the receiver.

Figure 8B:
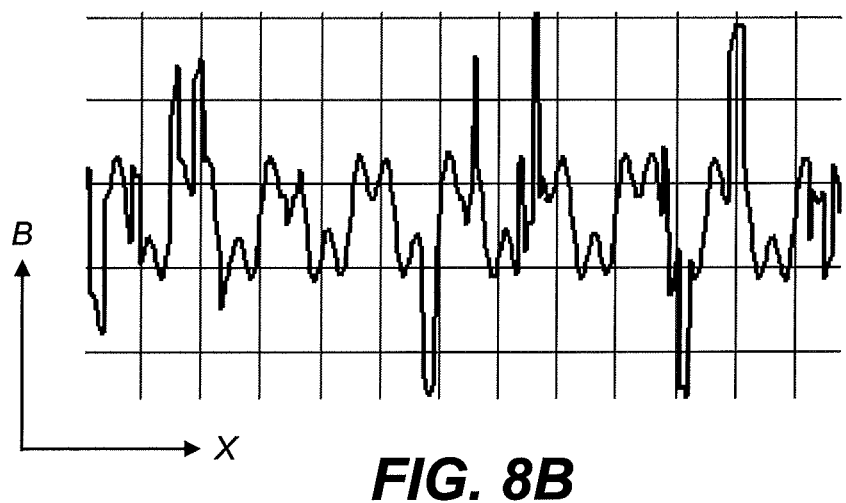
FIG. 8B shows a streak profile taken along a horizontal line in FIG. 8A.

FIG. 8B shows a streak profile taken along a single horizontal line in FIG. 8A. Line 8B-8B is an example of such a line. Lighter streaks are shown with larger values, and darker streaks with smaller, on brightness axis B (a.u.).

Figure 8C:
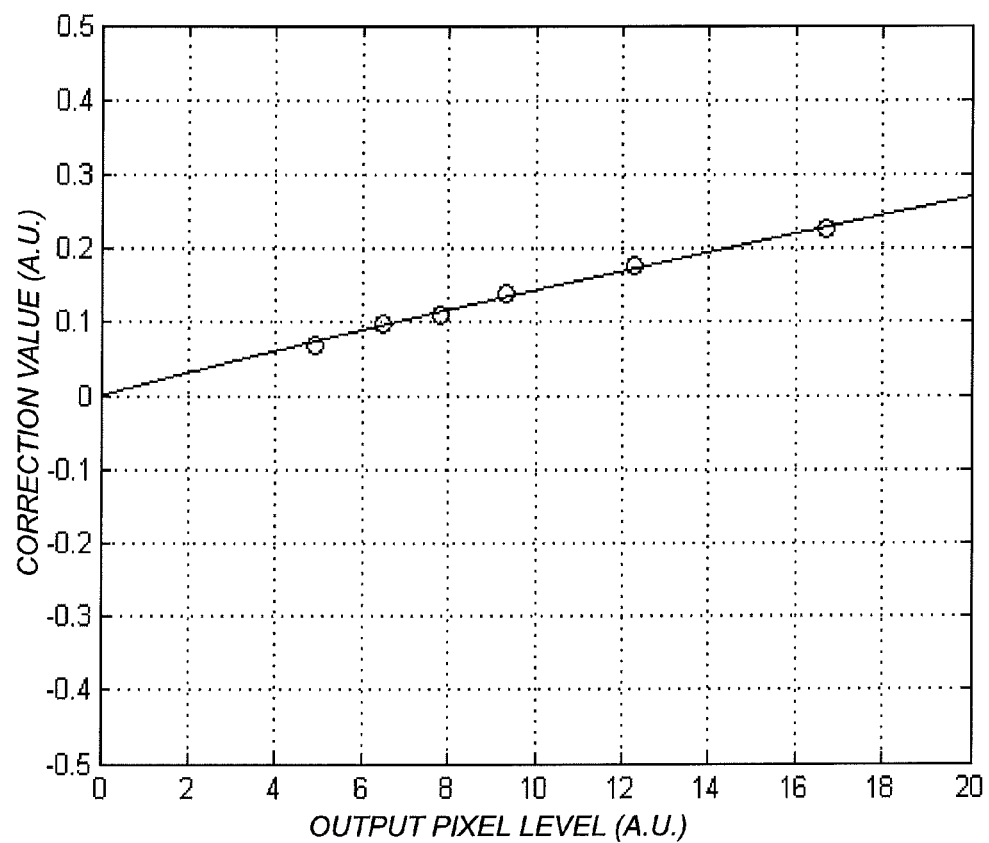
FIG. 8C shows compensation data for a representative streak.
Figure 8D:
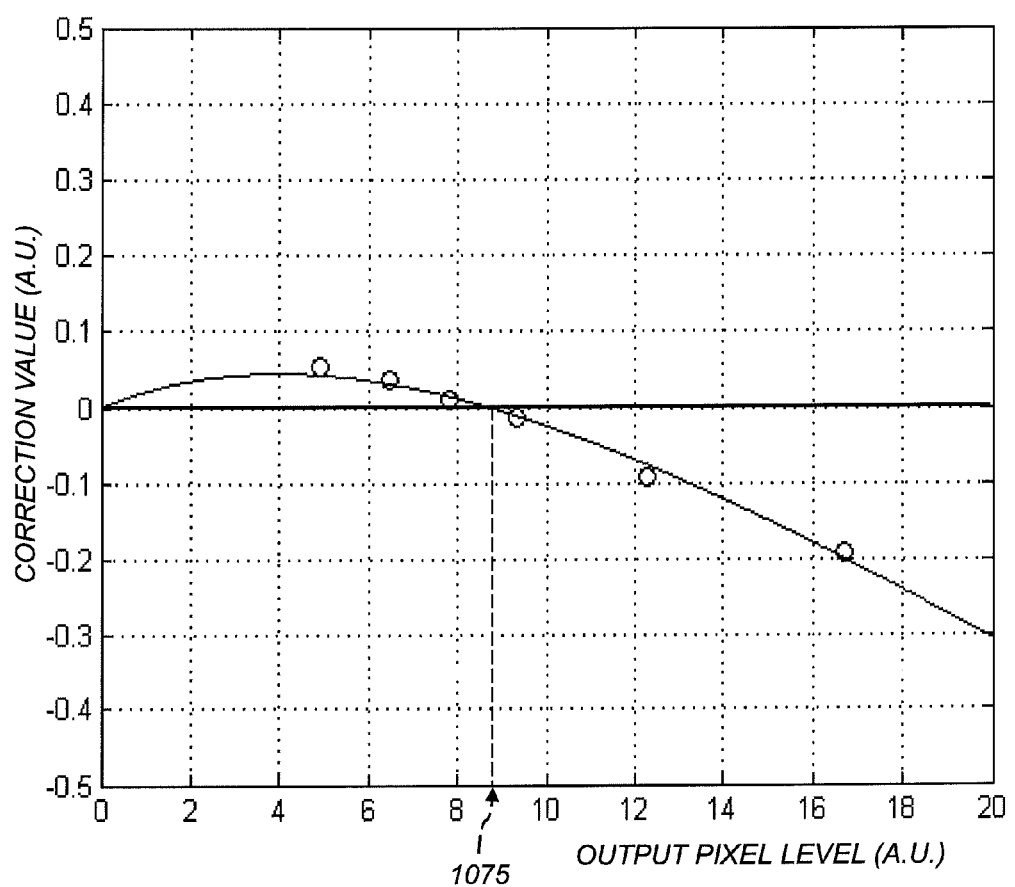
FIG. 8D shows compensation data for another representative streak.

FIGS. 8C and 8D show compensation data for two representative streaks. The abscissas correspond to screened pixel level 265 (FIG. 5A). The ordinates represent correction to compensate for non-uniformity, e.g., G1 values 515 (FIG. 5A). Each plot represents data for one column (extending in the Y direction of FIG. 8A) at various output pixel levels 220 (FIG. 2). Circles are measured points, and lines are fits of the measurements. These data correspond to a DAD (write-black) system, in which positive correction values increase density. In an embodiment, ordinate values correspond to a positive or negative offset to be added to the abscissa values to compensate for a streak.

FIG. 8C shows compensation data for a representative streak that lightens the print (reduces the exposure). In order to compensate for this streak, exposure is added to darken the print. As the desired density increases across the abscissa, more compensation exposure is added (increasing values on the ordinate). That is, all compensation data values are positive for this type of streak.

FIG. 8D shows compensation data for another representative streak that lightens the print when the desired exposure is below crossover 1075. However, in the same column, the streak darkens the print when the desired exposure is above crossover 1075. In order to compensate for this streak, exposure is added to darken the print when the desired exposure is below crossover 1075, and is subtracted to lighten the print when the desired exposure is above crossover 1075. That is, for this type of streak, compensation data values are positive for lower exposures and negative for higher exposures.

Figure 8E:
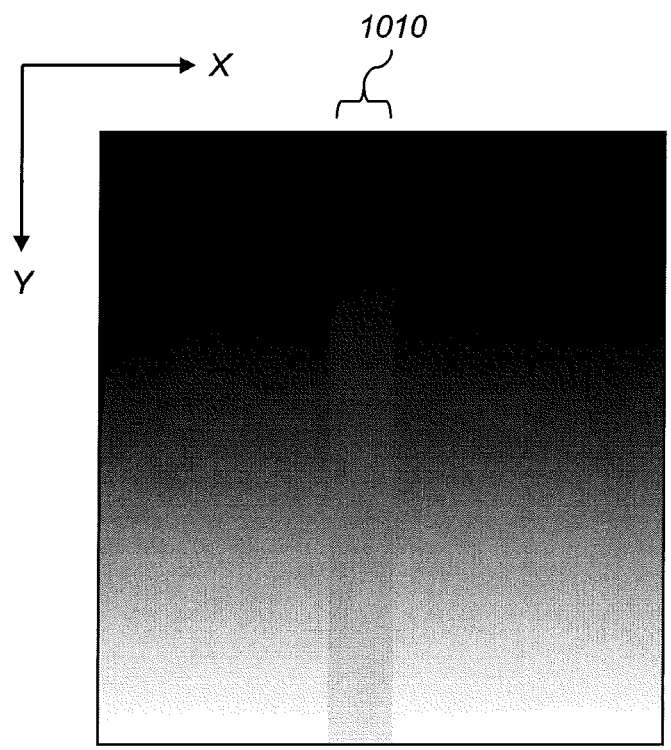
FIG. 8E shows another representative streak pattern.

FIG. 8E shows a representative streak pattern similar to that compensated by the data of FIG. 8D. To permit easier observation of the streak, only the X extent of bounding parallelogram 1010, here a rectangle, is shown. The streak is lighter than its surround when its surround is dark, and darker than its surround when its surround is light. This is the same phenomenon exhibited by the representative streak whose compensation data is shown in FIG. 8D.

Figure 8F:
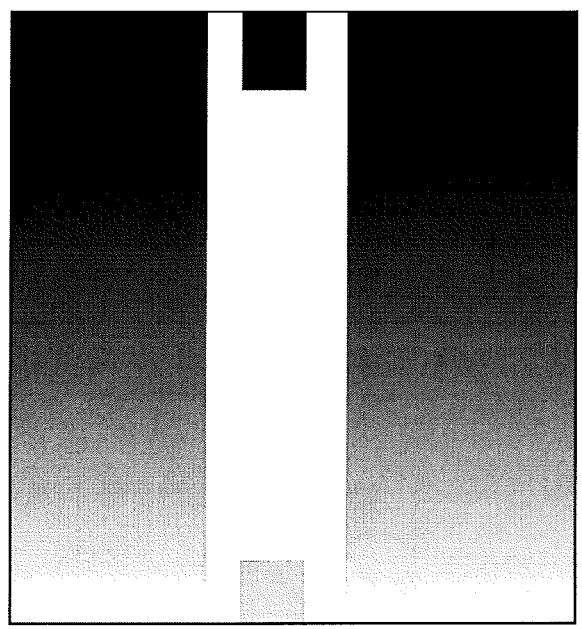
FIG. 8F shows an alternative view of the streak pattern of FIG. 8E.

FIG. 8F shows the same streak pattern as FIG. 8E, but with the center of the streak erased to more clearly show that the streak is darker at the top than at the bottom. This fact can be difficult to see in FIG. 8E due to optical illusions.

Figure 9:
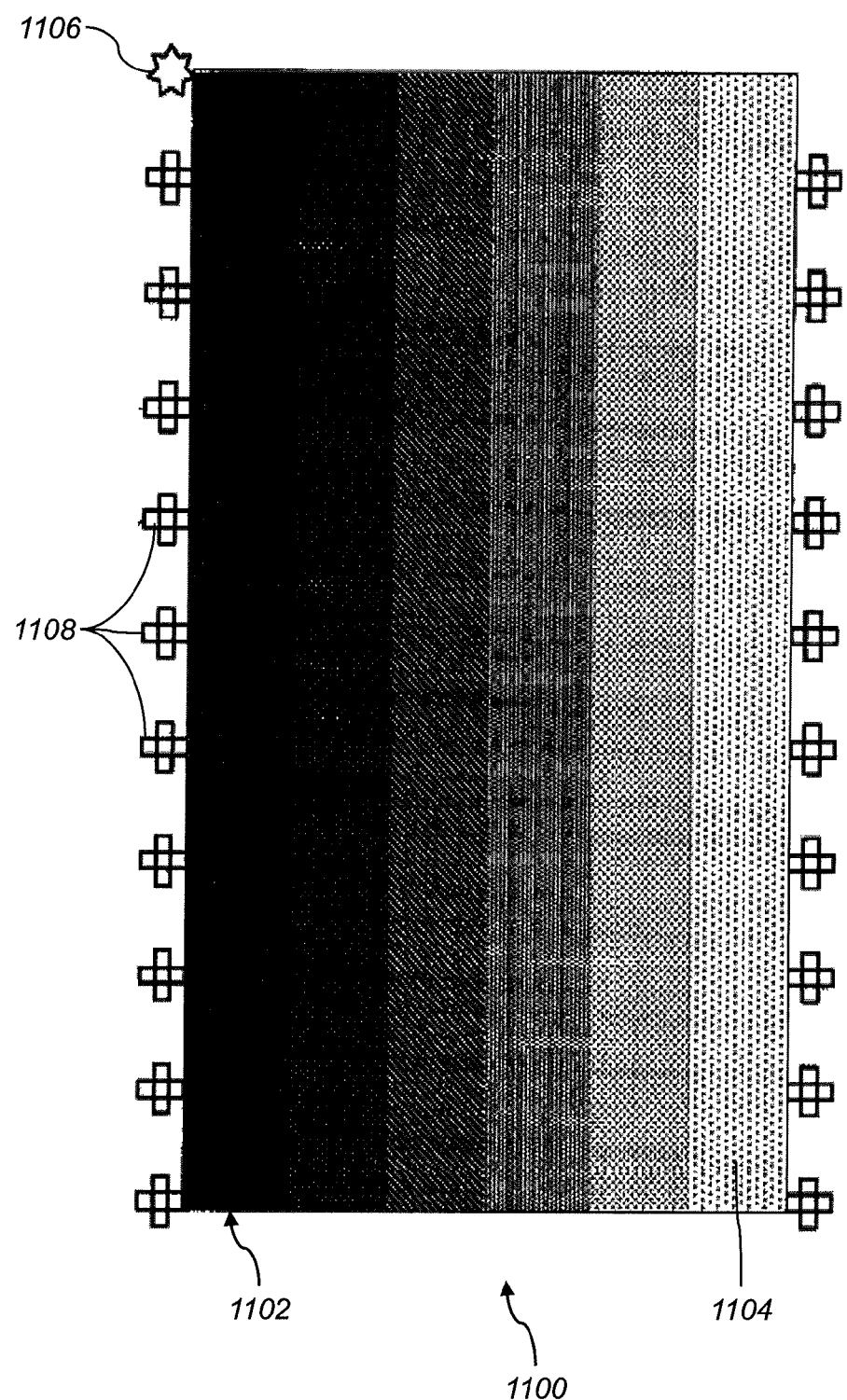
FIG. 9 shows an example of a test target for measuring the response of a printer.

FIG. 9 shows an example of a test target for measuring the response of a printer. Target 1100 includes multiple uniform-density images and two types of alignment marks. The uniform-density images vary in tone from a darker-tone uniform-density image 1102 to a lighter-tone uniform-density image 1104. The densities can be arranged across target 1100 in increasing, decreasing, random, or any other order. Alignment marks 1106, 1108 (shown enlarged for easier visibility) are used to correlate the location of the printed mark to a pixel location from exposure subsystem 22 (FIG. 1). When the exposure device is an LED printhead, the alignment marks are used to locate the exact LED array locations on the printhead.

Before printing target 1100, a relationship between output density and output pixel level for the print engine is determined. Moreover, all compensation is set to pass-through before printing target 1100, i.e., identity values are used for the adjustments (e.g. 0 for addition, 1 for multiplication). This advantageously causes the measured data to close approximate physically- or psychophysically-meaningful intervals between uniform-density images, and decouples the TRC from compensation. Different accuracies of compensation can be provided for different regions of the tonescale. In an embodiment, the desired densities of the uniform-density images (e.g. 1102, 1104) are selected to correspond to the desired accuracies of compensation. For example, if more accurate compensation is desired in the highlight region, the desired-density difference between adjacent uniform-density images can be smaller for desired densities corresponding to highlights than for desired densities corresponding to shadows.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST 21 charger
21a voltage source
22 exposure subsystem
23 toning station
23a voltage source
25 photoreceptor
25a voltage source
31, 32, 33, 34, 35, 36 printing module
38 print image
39 fused image
40 supply unit
42, 42A, 42B receiver
50 transfer subsystem
60 fuser
62 fusing roller
64 pressure roller
66 fusing nip
68 release fluid application substation
69 output tray
70 finisher
81 transport web
86 cleaning station
99 logic and control unit (LCU)
100 printer
200 input pixel levels
205 workflow inputs
210 image-processing path
220 output pixel levels
250 screening unit
260 screened pixel levels
262 compensation unit
265 compensated pixel levels
270 print engine
310 data-processing system
320 peripheral system
330 user-interface system
340 data-storage system
410 print test target step
420 receive measurements of test target step
430 receive an aim tonescale and crossover range step
440 compute respective column-tonescale gain step
450 determine adjustment tonescale step
460 compute adjustment-tonescale gains step
470 receive input pixel values step
472 compute first adjustment step
474 compute second adjustment step
476 expose photo-receptor step
478 more pixels? decision step
480 apply toner to photoreceptor step
490 transfer visible image step
505 offline radiometric data
510 test target
511 scan, process offline step
512 column tonescales
514 compute column-tonescale gains (G1) step
515 G1 gains
519 aim tonescale
521 residuals
522 determine adjustment tonescale step
524 Compute adjustment-tonescale gains (G2) step
525 G2 gains
529 adjustment tonescale 571 aim-tonescale (T1) mapping step
572 Adjustment-tonescale (T2) mapping step
575 T1*G1 multiplier
576 T2*G2 multiplier
578 adder
580 multiplier
582 adder
586 row position
587 banding LUT
589 online member measurements
590 optical driver
595 optical emitter
810 dot shape
820 dot shape
830 dot shape
910 tile
920 screen cell
930, 931, 932 engine pixel
1010 bounding parallelogram
1075 crossover
1100 target
1102, 1104 uniform-density image
1106, 1108 alignment mark
B brightness
X fast scan direction
Y slow scan direction

The invention claimed is:

1. A method of printing an image on a receiver using an electrophotographic printer having an optical writer adapted to expose a photoreceptor one row at a time in a cross-track direction and to deposit toner in a plurality of columns on the receiver, each column corresponding to a different cross-track position, the method comprising:

printing a test target having a plurality of input pixel values in each of the plurality of columns on a first receiver;

receiving measured densities for the printed test target to provide a respective column tonescale for each column, each column tonescale describing a relationship between the input pixel values and the measured densities for the respective column;

receiving an aim tonescale describing a relationship between the input pixel values and aim densities;

computing a respective column-tonescale gain for each column so that a scaled column tonescale formed by applying the column-tonescale gain to its respective column tonescale intersects the aim tonescale at a crossover point within a specified crossover range of pixel values;

computing residual errors for each column representing a difference between the aim tonescale and the scaled column tonescale;

determining an adjustment tonescale using the respective residual errors, wherein the adjustment tonescale relates each input pixel value to an exposure adjustment needed to more closely reproduce the aim density at that input pixel value, the adjustment tonescale changing sign within the crossover range;

determining a respective adjustment-tonescale gain for each column using the respective scaled column tonescale, the adjustment tonescale, and the aim tonescale;

receiving a plurality of input pixel values, each input pixel value having an associated column; and for each input pixel value:
determining an aim exposure for the input pixel value using the aim tonescale;
determining a first adjusted exposure by multiplying the aim exposure by the column-tonescale gain for the associated column;
determining a second adjusted exposure by multiplying the value of the adjustment tonescale at the input pixel value by the adjustment-tonescale gain for the associated column and adding the result to the first adjusted exposure;
using the optical writer to expose the photoreceptor in a respective pixel area according to the second adjusted exposure;

applying toner to the photoreceptor to form thereon a visible image corresponding to the exposure of the photoreceptor; and transferring the visible image to a second receiver so that a print corrected for nonuniformity is produced.

2. A method of printing an image on a receiver using an electrophotographic printer having an optical writer adapted to expose a photoreceptor one row at a time in a cross-track direction and to deposit toner in a plurality of columns on the receiver, each column corresponding to a different cross-track position, the method comprising:

printing a test target having a plurality of input pixel values in each of the plurality of columns on a first receiver;

receiving measured densities for the printed test target to provide a respective column tonescale for each column, each column tonescale describing a relationship between the input pixel values and the measured densities for the respective column;

determining a plurality of aim tonescales;

selecting one of the aim tonescales for each column and determining a respective column-tonescale gain for each column so that a scaled column tonescale formed by applying the column-tonescale gain to its respective column tonescale approximates the selected aim tonescale within a selected tolerance;

receiving a plurality of input pixel values, each input pixel value having an associated column; and for each input pixel value:
determining an aim exposure for the input pixel value using the selected aim tonescale;
determining an adjusted exposure by multiplying the aim exposure by the column-tonescale gain for the associated column; and
using the optical writer to expose the photoreceptor in a respective pixel area according to the adjusted exposure;

applying toner to the photoreceptor to form thereon a visible image corresponding to the exposure of the photoreceptor; and transferring the visible image to a second receiver so that a print corrected for nonuniformity is produced.

3. The method according to claim 1, further including modifying the second adjusted exposure by multiplying the second adjusted exposure by a gain or adding an offset to the second adjusted exposure, or both, wherein the gain, if any, and offset, if any, are computed based on the row of the pixel.

4. The method according to claim 3, wherein one or both of the gain and offset are determined based on measurements taken of one or more selected members in the printer that produce in-track banding.

* * * * *